United States Patent
Louwe et al.

(10) Patent No.: US 12,168,611 B2
(45) Date of Patent: Dec. 17, 2024

(54) METHOD AND CRYSTALLIZING TANK AND ARRANGEMENT THEREOF FOR CRYSTALLIZING CALCIUM NITRATE FROM THE NITRO-PHOSPHATE PROCESS

(71) Applicant: Yara International ASA, Oslo (NO)

(72) Inventors: Robertus Louwe, Porsgrunn (NO); Olav Lier, Porsgrunn (NO)

(73) Assignee: Yara International ASA, Oslo (NO)

( * ) Notice: Subject to any disclaimer, the term of this patent is extended or adjusted under 35 U.S.C. 154(b) by 617 days.

(21) Appl. No.: 17/612,521

(22) PCT Filed: Jul. 9, 2020

(86) PCT No.: PCT/EP2020/069342
§ 371 (c)(1),
(2) Date: Nov. 18, 2021

(87) PCT Pub. No.: WO2021/005146
PCT Pub. Date: Jan. 14, 2021

(65) Prior Publication Data
US 2022/0212944 A1 Jul. 7, 2022

(30) Foreign Application Priority Data
Jul. 9, 2019 (EP) ..................... 19185147

(51) Int. Cl.
*C01F 11/44* (2006.01)
*B01D 9/00* (2006.01)
(Continued)

(52) U.S. Cl.
CPC ............ *C01F 11/44* (2013.01); *B01D 9/0013* (2013.01); *B01D 9/0045* (2013.01);
(Continued)

(58) Field of Classification Search
CPC .... C01F 11/44; B01F 27/0727; B01F 27/191; B01F 27/906; B01F 27/112; B01F 35/93;
(Continued)

(56) References Cited

FOREIGN PATENT DOCUMENTS

| EP | 2 136 895 A1 | 12/2009 |
|---|---|---|
| GB | 827 749 A | 2/1960 |

(Continued)

OTHER PUBLICATIONS

International Search Report and Written Opinion in related PCT/EP2020/069342 dated Oct. 29, 2020, 15 pages.
(Continued)

*Primary Examiner* — Anita Nassiri-Motlagh
(74) *Attorney, Agent, or Firm* — Dilworth IP, LLC (57) ABSTRACT

A method for crystallizing calcium nitrate from an aqueous calcium nitrate composition including from 6 to 12 weight % nitric acid, from 11 to 17 weight % phosphoric acid, and from 36 to 49 weight % dissolved calcium nitrate, which aqueous composition is optionally directly obtainable from digesting phosphate rock in nitric acid. The method includes filling at least one vertical crystallizing tank through an inlet with the aqueous calcium nitrate composition. The crystallizing tank includes a vertical cylindrical section, a first inlet, a first outlet, a second inlet, three concentric banks of cooling coils, an agitator, and a temperature measurement device. The method includes circulating through the banks of cooling coils a cooling fluid, having an initial temperature ranging from −40° C. to −5° C., and rotating the agitator such that a minimum average heat transfer of 400 W/m²·K is achieved on the cooling coil the most distant from the agitator.

21 Claims, 5 Drawing Sheets

(51) Int. Cl.
| | | |
|---|---|---|
| *B01F 27/072* | (2022.01) | |
| *B01F 27/112* | (2022.01) | |
| *B01F 27/191* | (2022.01) | |
| *B01F 27/906* | (2022.01) | |
| *B01F 35/90* | (2022.01) | |
| *B01F 35/93* | (2022.01) | |
| *B01F 101/00* | (2022.01) | |

(52) U.S. Cl.
CPC ........ *B01D 9/0063* (2013.01); *B01F 27/0727* (2022.01); *B01F 27/112* (2022.01); *B01F 27/191* (2022.01); *B01F 27/906* (2022.01); *B01F 35/93* (2022.01); *B01D 2009/0086* (2013.01); *B01F 2035/98* (2022.01); *B01F 2101/2204* (2022.01); *B01F 2215/044* (2013.01); *B01F 2215/0472* (2013.01); *B01F 2215/0481* (2013.01)

(58) Field of Classification Search
CPC ......... B01F 2101/2204; B01F 2035/98; B01D 9/0013; B01D 9/0045; B01D 9/0063; B01D 2009/0086
USPC ....................................................... 423/397
See application file for complete search history.

(56) References Cited

FOREIGN PATENT DOCUMENTS

| | | |
|---|---|---|
| GB | 1 012 721 A | 12/1965 |
| WO | 2008113386 A1 | 9/2008 |

OTHER PUBLICATIONS

European Search Report in related EP19185147.6 dated Feb. 10, 2020, 7 pages.
A.H.P. Skelland et al: "Suspended solids distribution in agitated, baffled vessels containing three concentric cooling coils", Chemical Engineering Science, vol. 54, No. 19, Oct. 1999, pp. 4273-4284.

METHOD AND CRYSTALLIZING TANK AND ARRANGEMENT THEREOF FOR CRYSTALLIZING CALCIUM NITRATE FROM THE NITRO-PHOSPHATE PROCESS

FIELD OF THE INVENTION

The present disclosure relates to the field of calcium nitrate crystallization, more in particular calcium nitrate originating from the nitro-phosphate process, and more in particular to a method, a crystallizing tank and an arrangement of crystallizing tanks, for performing a calcium nitrate crystallization.

BACKGROUND

The nitro-phosphate process (also known as the Odda process) is a method for the industrial production of fertilizers compounds. The process involves acidifying phosphate rock with nitric acid to produce a mixture of phosphoric acid and calcium nitrate.

$$Ca_3(PO_4)_2 + 6HNO_3 + 12H_2O \rightarrow 2H_3PO_4 + 3Ca(NO_3)_2 + 12H_2O$$

The mixture is cooled to a temperature range, e.g., from −20° C. to 10° C., upon which the calcium nitrate crystallizes as calcium nitrate tetrahydrate and can be separated from the phosphoric acid.

$$2H_3PO_4 + 3Ca(NO_3)_2 + 12H_2O \rightarrow 2H_3PO_4 + 3Ca(NO_3)_2 \cdot 4H_2O$$

The resulting calcium nitrate tetrahydrate can be used for the production of nitrogen fertilizer. The filtrate is composed mainly of phosphoric acid with some nitric acid and traces of calcium nitrate, and this is neutralized with ammonia to produce a compound fertilizer.

In order to reduce the crystallization time for calcium nitrate and thereby improve the process capacity and/or efficiency, it is essential to optimize the crystallization efficiency.

GB827749 (A) discloses a reaction and cooling tank (Frick Co Inc, 1956) with a centrally located agitator. The thermo-regulator system comprises a series of vertically disposed cooling coils suspended within the reactor tank, extending from the top of the reactor downwardly. The cooling unit coils are composed of individual groups of heat transfer tubes, each tube running parallel to each other and the reactor wall.

GB1012721 (A) (Laporte Chemicals Ltd., 1961) discloses a crystallization apparatus having cooling coils which are coupled to a vibrating means to reduce the scaling of the cooling coil. The patent application describes that the apparatus as having a single concentrically mounted cooling coil, and it also foresees an embodiment having two such cooling coils, an inner and an outer cooling coil which are arranged in parallel to each other.

EP2136895 (B1) (Technische Universiteit Delft, 2007) discloses a crystallization apparatus comprising a number of modular parts, each part comprising a cooled wall portion and lines for running a cooling fluid. One embodiment discloses three modular parts of annular cooling elements, each element being arranged parallel the vessel wall and being on top of each other. This type of modular design provides a more accurate operation because of the relatively large scraped cooled surface, creating a relatively high heat transfer.

The prior art does not disclose the use of a crystallizer with three concentric banks of cooling coils, running alongside each other, in particular for crystallizing calcium nitrate, in particular as calcium nitrate tetrahydrate. The crystallizing tank according to the invention has an increased cooling capacity compared to a prior art crystallizing tank of the same volume and comprising only two banks of cooling coils.

SUMMARY OF THE INVENTION

According to one aspect of the invention, a method is disclosed for crystallizing calcium nitrate from an aqueous calcium nitrate composition comprising from 6 to 12 weight % nitric acid, from 11 to 17 weight % phosphoric acid, and from 36 to 49 weight % dissolved calcium nitrate, comprising the steps of:
a) filling at least one vertical crystallizing tank through an inlet with the aqueous calcium nitrate composition, the crystallizing tank comprising:
a vertical cylindrical section defined by a top end and a bottom end, each end having a circular cross section;
a first inlet for introducing the aqueous calcium nitrate composition into the cylindrical section;
a first outlet for draining a slurry of crystallized calcium nitrate at the bottom end;
a second inlet for introducing an aqueous washing composition;
optionally, a second outlet for draining the aqueous washing composition at the bottom end;
concentric banks of cooling coils running alongside each other and parallel to the axis running through the centers of the circular cross section of the top end and the bottom end of the cylindrical section;
an agitator equipped with paddles fixed to its rotation axis which runs through the centers of the two circular bases of the cylindrical section, driven by an agitator motor; and
a temperature measurement device for measuring a temperature in the crystallizing tank;
b) circulating a cooling fluid through the banks of cooling coils, having an initial temperature ranging from −40° C. to −5° C. and
c) rotating the agitator such that a minimum heat transfer is achieved;
wherein the crystallizing tank comprises three banks of cooling coils and the agitator is rotated at such agitation speed that a minimum average heat transfer of 400 W/m²·K is achieved on the bank of cooling coils the most distant from the agitator.

Surprisingly, the inventors have found that, contrary to what is suggested in the prior art, a crystallizing tank using three banks of cooling coils can still be effectively operated by selecting the right design and rotary speed of the agitator, in order to achieve satisfactory heat transfer on the banks of cooling coils for achieving optimal crystallization efficiency. In the prior art, it is suggested that a higher number of banks of cooling coils clogs up the internal volume of the crystallizing tank, thereby lowering the efficiency of crystallization.

According to another aspect of the invention, a vertical crystallizing tank is disclosed, comprising:
a vertical cylindrical section defined by a top end and a bottom end, each end having a circular cross section;
a first inlet for introducing an aqueous composition comprising one or more dissolved compounds;
a second inlet for introducing an aqueous washing composition;

a first outlet for draining a slurry of crystallized one or more dissolved compounds at the bottom end;

optionally, a second outlet for draining the aqueous washing composition at the bottom end;

concentric banks of cooling coils running alongside each other and parallel to the axis running through the centers of the circular cross section of the top end and the bottom end of the cylindrical section;

a cooling fluid circulating through the banks of cooling coils;

a temperature measurement device for measuring a temperature in the crystallizing tank and an agitator equipped with paddles fixed to its rotation axis which runs through the centers of the two circular bases of the cylindrical section, driven by an agitator motor; wherein the number of banks of cooling coils is three.

The crystallizing tank according to the invention has a large cooling capacity and cooling efficiency.

According to another aspect of the invention, an arrangement of two or more vertical crystallizing tanks as disclosed above is disclosed comprising at least a first crystallizing tank as disclosed above, and a last crystallizing tank as disclosed above, wherein the banks of cooling coils are interconnected between the two or more vertical crystallizing tanks.

Because of the three banks of cooling coils, the temperature of the cooling fluid only moderately increases during operation. This allows for a reuse of cooling fluid and a more effective energy consumption. Furthermore, it allows the crystallizing tanks to be operated in a flexible way.

DETAILED DESCRIPTION

Throughout the description and claims of this specification, the words "comprise" and variations of them mean "including but not limited to," and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties, or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points. The term "ranges from . . . to" as used when referring to a range for a measurable value, such as a parameter, an amount, a time period, and the like, is intended to include the limits associated to the range that is disclosed.

The term "approximately" as used when referring to a measurable value, such as a parameter, an amount, a time period, and the like, is intended to represent the measurement error associated with the technique to measure such parameter, amount, time period, and the like, and is considered to be 5% or less, depending on the measurement technique used. It should be understood that the value to which the term "approximately" refers per se has also been disclosed.

All references cited in this description are hereby deemed to be incorporated in their entirety by way of reference.

Method for Crystallizing Calcium Nitrate

Calcium nitrate tetrahydrate can be formed by crystallizing dissolved calcium nitrate from a (hot) melt of phosphate rock, such as apatite, digested in nitric acid, upon cooling down to a temperature in the range of from −20° C. to 10° C. The crystallized calcium nitrate tetrahydrate can subsequently be filtered and processed for purification and particulation in order to yield granules of a calcium nitrate salt-based mixture. The melt is defined as having from 6 to 12 weight % nitric acid, from 11 to 17 weight % phosphoric acid, and from 36 to 49 weight % dissolved calcium nitrate.

The inventors have now found that the formation of calcium nitrate tetrahydrate by crystallization from a melt containing dissolved calcium nitrate can be improved by using a vertical crystallizing tanks comprising three banks of concentric banks cooling coils running alongside each other. In order to ensure that the available cooling capacity is optimally used, an agitator inside the crystallizing tank must be properly designed and agitated at a sufficient speed, such that an improved heat transfer coefficient on the banks of cooling coils is achieved. The speed can be easily determined by a skilled person and is at least dependent on the volume of the tank.

According to an aspect of the disclosure, a method is disclosed for crystallizing calcium nitrate from an aqueous calcium nitrate composition comprising from 6 to 12 weight % nitric acid, from 11 to 17 weight % phosphoric acid, and from 36 to 49 weight % dissolved calcium nitrate. The aqueous calcium nitrate composition may be directly obtainable from digesting phosphate rock in nitric acid. The method comprises three main steps. One of the steps of the method, the filling step, involves filling at least one vertical crystallizing tank with the aqueous calcium nitrate composition.

Figure 1:
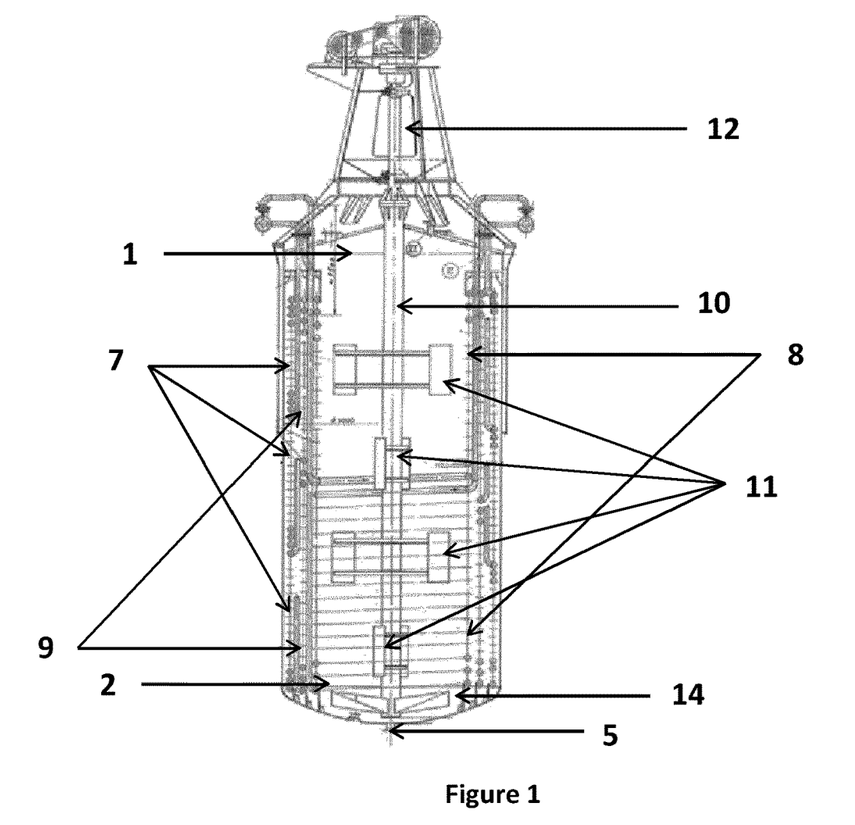
FIG. 1: shows a crystallizing tank according to the disclosure.
Figure 2:
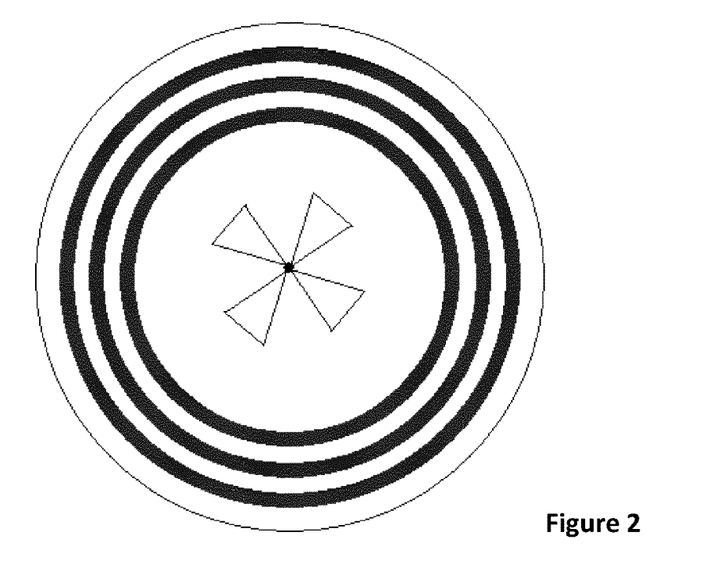
FIG. 2: shows a top view of a crystallizing tank according to the disclosure.

FIG. 1 shows a crystallizing tank according to the invention. FIG. 2 shows a top view for a crystallizing tank according to the invention. As defined herein the crystallizing tank comprises several features. The crystallizing tank comprises a vertical cylindrical section defined by a top end 1 and a bottom end 2 each having a circular cross section.

The crystallizing tank further comprises two separate inlets. A first inlet 3 is suitable for introducing the aqueous calcium nitrate composition into the cylindrical section. A second inlet 4 is suitable for introducing an aqueous washing composition. In particular, as the method of the present disclosure does not require the aqueous calcium nitrate composition and the aqueous washing composition to be introduced simultaneously into the crystallizing tank, the first inlet 3 may be equal to the second inlet 4 and the design of the crystallizer may be simplified as it comprises only one inlet for introducing both the aqueous calcium nitrate composition and the aqueous washing composition.

Once calcium nitrate tetrahydrate has been formed by crystallization from the aqueous calcium nitrate composition, a slurry of crystallized calcium nitrate is obtained that can be collected at the bottom at a first outlet for draining a slurry of crystallized calcium nitrate 5. The aqueous washing composition can optionally be drained, after removal of the scaling inside the crystallizing tank, at a second outlet 6 (not shown) at the bottom end. In particular, as the method of the present disclosure does not require the slurry of crystallized calcium nitrate and the aqueous washing composition to be drained simultaneously, the first outlet for draining a slurry of crystallized calcium nitrate 5 is equal to the second outlet 6 and the design of the crystallizer is simplified as it comprises only one outlet for introducing both the aqueous calcium nitrate composition and the aqueous washing composition.

The crystallizing tank of the method further comprises three concentric banks of cooling coils, 7, 8 and 9, running alongside each other and parallel to the axis running through the centers of the circular cross section of the top end 1 and the bottom end 2 of the cylindrical section. As defined herein, a bank of cooling coil is a multiplicity of connected or non-connected separate coils, at the same distance from the axis as defined above. In particular, the outer bank of cooling coils 7, most distant from the axis, comprises three non-connected coils. In particular, the inner bank of cooling coils 8 comprises two connected or non-connected coils. In particular, the middle bank of cooling coils 9, between the outer and the inner banks, comprises two non-connected coils. According to one particular embodiment, in a crystallizing tank with a volume of approximately 43 m$^3$, the cooling area is approximately 220 m$^2$ and the cooling area associated to the outer coil is approximately 102 m$^2$, the cooling area associated to the middle coil is approximately 67 m$^2$ and the cooling are associated to the inner coil is approximately 51 m$^2$.

In addition, the crystallizing tank of the method comprises an agitator 10 equipped with paddles 11 fixed to its rotation axis which runs through the centers of the two circular bases of the cylindrical section, driven by an agitator motor 12. In particular, the agitator comprises four paddles 11, creating a radial flow pattern in the crystallizing tank. In particular, the paddles can be perpendicular or slanted with respect to the rotation axis. More in particular, the paddles are perpendicular to the rotation axis as; in this manner, the distribution of the aqueous composition comprising the one or more compounds to be crystallized, in particular calcium nitrate, towards the banks of cooling is optimized and the crystallization efficiency is, thereby, optimized.

Finally, the crystallizing tank of the method comprises a temperature measurement device 13 (not shown) for measuring a temperature in the crystallizing tank.

A second step of the method, the cooling step, involves circulating a cooling fluid having an initial temperature ranging from −40° C. to −5° C. through the banks of cooling coils 7, 8 and 9. As defined herein and throughout this disclosure, the initial temperature of the cooling fluid is the temperature of the cooling fluid as it enters the banks of cooling of coils of the crystallizing tank for being circulated in the banks of cooling of coils. A third step of the method, the agitating step, involves rotating the agitator 10 in the crystallizing tank such that a minimum average heat transfer of 400 W/m$^2$·K is achieved on the cooling coil the most distant from the agitator 7. As defined herein, the average heat transfer corresponds to the average of at least three measurements made at different locations on the cooling coil. In particular, the minimum average heat transfer is achieved in the initial stage of the cooling step: at the beginning of the cooling step, as the aqueous calcium nitrate composition and the cooling fluid begin to exchange heat, the temperature difference between the aqueous calcium nitrate composition and the cooling fluid is at its highest and banks of cooling coils are not yet scaled by crystals of calcium nitrate tetra hydrate, which allows for maximum heat transfer. Throughout the cooling process, as the temperature difference between the aqueous calcium nitrate composition and the cooling fluid decreases and the banks of cooling coils become scaled by crystals of calcium nitrate tetrahydrate, the heat transfer will decrease. However, the person skilled in the art knows that one or more of the followings will allow maintaining the heat transfer coefficient or even increase it:

cleaning of the banks of cooling coils, preferably performed during the cooling step;

increasing the agitation speed;

collecting the cooling fluid outside the crystallizing tank and circulating fresh cooling fluid having an initial temperature ranging from −40° C. to −5° C. through the banks of cooling coils.

Hence, the person skilled in the art will easily recognize that the claimed minimum heat transfer of 400 W/m$^2$·K and/or higher heat transfer values on the cooling coil the most distant from the agitator, can be achieved by ensuring sufficient agitation speed.

According to one embodiment of the method of the disclosure, the method is performed by first performing step a)—the filling step, subsequently, step c)—the agitating step, and finally step b)—the cooling step. By performing the method steps in this order, the aqueous calcium nitrate composition is distributed onto the bank of cooling coils 7, 8 and 9 and cooled at an optimal speed and it is ensured that the solids (i.e., the formed calcium nitrate tetrahydrate) inside the crystallizing tank do not settle at the bottom end of the tank According to one embodiment of the method of the disclosure, the cooling fluid is selected from the group of water, ammonia, and mixtures thereof. Such cooling fluids are especially suitable as they can be cooled to a temperature from −40° C. to −5° C., for example by heat exchange with water and ammonia.

According to a further embodiment, the cooling fluid is a 20 weight % solution of ammonia in water.

According to one embodiment of the method of the disclosure, the method may comprise four further consecutive steps. The first of the steps, the temperature measurement step, involves measuring the temperature with the temperature measurement device 13 in the crystallizing tank. The second of those steps, the draining step, involves draining the content of the crystallizing tank through the first outlet for draining the slurry of crystallized material 5 when the temperature reaches a value between 0 and 4° C. The third of those steps is the cleaning step and involves removing the scaling from the inside of the crystallizing tank, in particular the banks of cooling coils 7, 8 and 9, with the aqueous washing composition, after introduction of the aqueous washing composition through the second inlet 4 of the crystallizing tank. During the fourth of those steps, the aqueous washing composition is optionally drained through the second outlet 6. According to one embodiment, the aqueous composition is not drained following the washing step but left in the crystallizing tank and mixed with the aqueous calcium nitrate composition when step a) is repeated, which allows for the introduction of a more concentrated aqueous calcium nitrate composition.

The crystallization can, therefore, be performed batchwise: upon completion of the crystallization, the content of the crystallizing tank can be drained and scaling inside the crystallizing tank, in particular on the banks of cooling coils 7, 8 and 9, can be removed in order to offer the optimal cooling area, for achieving optimal cooling efficiency, prior to filling the crystallizing tank with another batch of the aqueous calcium nitrate composition from which calcium nitrate tetrahydrate is to be crystallized. For example, steaming can be performed to remove scaling inside the crystallizing tank. Steam offers the advantage of the reduction of the water consumption as the hot temperature allows for more efficient removal of the scaling. Alternatives for cleaning, such as liquid water washing, ultrasonic treatment, or mechanical cleaning involving scrapping of the scaled surfaces, are also suitable.

According to an embodiment of the method of the disclosure, referred to as the "two stages crystallization process," using two distinct crystallizing tanks, the following consecutive steps are performed, following the agitation step:

- the temperature is measured with the temperature measurement device in a first crystallizing tank according to the crystallizing tank of the disclosure;
- upon detecting an increase in the temperature in the first crystallizing tank, which generally is observed once the slurry of crystallized material reaches a temperature between 15 and 22° C., the content of the first crystallizing tank is drained through its first outlet for draining the crystal slurry 5 into a second crystallizing tank according to the crystallizing tank of the disclosure;
- a cooling fluid having an initial temperature ranging from −40° C. to −5° C. is circulated through the banks of cooling coils 7, 8 and 9 of the second crystallizing tank;
- the agitator of the second crystallizing tank is rotated such that a minimum average heat transfer of 400 W/m²·K is achieved on the cooling coil bank the most distant from the agitator;
- the scaling inside the first crystallizing tank is removed with the aqueous washing composition after introduction of the washing composition through the second inlet 4 of the first crystallizing tank, and
- optionally, the aqueous washing composition is drained through the second outlet 6 of the first crystallizing tank;

wherein the cooling fluid in the first crystallizing tank is water, and wherein the cooling fluid in the second crystallizing tank is a 20 weight % solution of ammonia in water.

In particular, in the first crystallizing tank, the middle bank of cooling coils 9 comprises two connected coils. In particular, in the second crystallizing tank, the middle bank of cooling coils 9 comprises two non-connected coils. In particular, the banks of cooling coils are in parallel communication. By parallel, it is meant here that there is no fluid communication between the banks of cooling coils 7, 8 and 9 in one crystallizing tank and between the banks of cooling coils 7, 8 and 9 of different crystallizing tanks.

The cooling fluid circulating in the bank of cooling coils of the second crystallizer can be the same as or different from the cooling fluid circulated in the banks of cooling coils of the first crystallizer. An advantage of the two stages crystallization process is that it allows different cooling fluids to be circulating in the banks of cooling coils of the two crystallizing tanks, at different temperature ranges, in order to optimize the efficiency of the crystallization in each crystallizing tank. In particular, in the first crystallizing tank of a two stages crystallization process, the cooling fluid circulating in the banks of cooling coils is water and has an initial temperature in the range of from 4 to 10° C. and an average of approximately 6° C. In particular, the cooling fluid circulating in the banks of cooling coils of the second crystallizing tank is ammonia and has an initial temperature in the range of from −15° C. to −5° C. and an average temperature of approximately −3° C. In this manner, the crystallization efficiency in each crystallizing tank is optimized. This embodiment offers the possibility to remove scaling in the inside of a crystallizing tank while crystallization takes place in another crystallizing tank. In the "two stages crystallization process" embodiment, scaling is removed inside one crystallizing tank while crystallization proceeds in another crystallizing tank. A further arrangement according to the disclosure (see below) allows for the crystallization to proceed in multiple crystallizing tanks while scaling is removed inside one crystallizing tank. The person skilled in the art will envisage the possibility for the "two stages crystallization process" to be performed in parallel, in as many sets of two crystallizing tanks as is required, in order to process the entire volume of the aqueous composition from which calcium nitrate is to be crystallized.

In one embodiment of the "two stages crystallization process," the following further consecutive steps are performed:

- measuring the temperature in the second crystallizing tank;
- draining the content of the second crystallizing tank through its first outlet 5 when the temperature reaches a value ranging from 0 to 4° C.
- introducing the aqueous washing composition through the first inlet 4 of the second crystallizing tank and removing the scaling from the inside of the second crystallizing tank, and
- optionally, draining the aqueous washing composition through the second outlet 6 of the second crystallizing tank.

According to a preferred embodiment of the method, the aqueous calcium nitrate composition comprising from 6 to 12 weight % nitric acid, from 11 to 17 weight % phosphoric acid, and from 36 to 49 weight % dissolved calcium nitrate is directly obtainable from digesting phosphate rock in nitric acid Crystallizing Tank According to another aspect of the disclosure, a vertical crystallizing tank is disclosed which is suitable for crystallizing one or more dissolved compounds from an aqueous composition thereof. FIG. 1 shows a crystallizing tank according to the invention. The crystallizing tank comprises a vertical cylindrical section defined by a top end 1 and a bottom end 2 each having a circular cross section. The crystallizing tank further comprises two separate inlets. A first inlet 3 is suitable for introducing the aqueous composition comprising one or more dissolved compounds into the cylindrical section. A second inlet 4 is suitable for introducing an aqueous washing composition. According to one embodiment, the first inlet 3 is equal to the second inlet 4 and the design of the crystallizer is simplified as it comprises only one inlet for introducing both the aqueous composition comprising one or more dissolved compounds and the aqueous washing composition.

The crystallizing tank further comprises three banks of cooling coils 7, 8 and 9 running alongside each other and parallel to the axis running through the centers of the circular cross section of the top end 1 and the bottom end 2 of the cylindrical section. In particular, the outer bank of cooling coils 7, most distant from the axis, comprises three non-connected coils. In particular, the inner bank of cooling coils 8 comprises two connected or non-connected coils. In particular, the middle bank of cooling coils 9, between the outer and the inner banks, comprises two non-connected coils. According to a particular embodiment, in a crystallizing tank with a volume of approximately 43 m$^3$, the cooling area is approximately 220 m$^2$ and the cooling area associated to the outer coil is approximately 102 m$^2$, the cooling area associated to the middle coil is approximately 67 m$^2$ and the cooling are associated to the inner coil is approximately 51 m$^2$.

In addition, the crystallizing tank comprises an agitator 10 equipped with paddles 11 fixed to its rotation axis which runs through the centers of the two circular bases of the cylindrical section, driven by an agitator motor 12. In particular, the agitator comprises four paddles, creating a radial flow pattern in the crystallizing tank. In particular, the paddles can be perpendicular or slanted with respect to the rotation axis. More in particular, the paddles are perpendicular to the rotation axis as, in this manner, the distribution of the aqueous composition towards the banks of cooling is optimized and the crystallization efficiency is, thereby, optimized.

Finally, the crystallizing tank comprises a temperature measurement device 13 for measuring a temperature in the crystallizing tank.

In particular, the crystallizing tank may be in fluid communication with a ventilation duct through which the gases such as nitrogen oxides and nitrous oxide emitted from the aqueous composition comprising dissolved compounds to be crystallized are directed to an appropriate scrubbing system.

According to one embodiment of the crystallizing tank of the disclosure, the bottom end has a conical shape 14. Such conical shape is optimal to drain the slurry of crystallized material through the outlet 5 and the aqueous washing composition at the bottom of the crystallizing tank.

According to one embodiment of the crystallizing tank of the disclosure, the cylindrical section of the crystallizing tank has a height to diameter ratio ranging from 1.5 to 2.5. With such a height to diameter ratio, the ratio of the cooling area on the bank of cooling coils to the volume of aqueous composition comprising one or more dissolved compounds is optimized, which reduces the cooling time. The crystallization efficiency is, hence, maximized.

Arrangement of a Series of Crystallizing Tanks with Interconnected Cooling Banks According to a further aspect of the disclosure, an arrangement of a series of crystallizing tanks according to the crystallizing tank of the disclosure is disclosed. The arrangement comprises two or more crystallizing tanks according to the crystallizing tank of the disclosure, comprising at least a first crystallizing tank and a last crystallizing tank, wherein the banks of cooling coils of said two or more vertical crystallizing tanks are interconnected, i.e., connected between the respective crystallizing tanks. In particular, the middle bank of cooling coils 9 in each crystallizing tank comprises two coils connected in series. In particular, the arrangement comprises six crystallizing tanks of which the banks of cooling coils are interconnected. The multiplicity of crystallizing tanks allows for larger volumes of the aqueous composition to be crystallized. Furthermore, the interconnection of the cooling banks allows for the reuse of cooling fluid from one crystallizing tank to the next, due to the large cooling efficiency of a single crystallizing tank and the relative low warm-up of the cooling fluid during use.

When operating the arrangement, during the filling step, each crystallizing tank in the arrangement is in direct fluid communication with a pump pumping the aqueous composition comprising the dissolved one or more compounds into the crystallizing tank. Such arrangement offers the possibility to pump said aqueous composition comprising the dissolved one or more compounds from a common reservoir of the aqueous composition comprising the dissolved one or more compounds, into each crystallizing tank. The arrangement further offers, for example by using a rotary pump and through a system of valves, the possibility to pump the aqueous composition comprising the dissolved one or more compounds in each tank separately, following the draining and cleaning steps and the optional draining of the aqueous washing composition, while crystallization is proceeding in other crystallizing tanks.

According to one embodiment of the arrangement of crystallizing tanks, the banks of cooling coils 7, 8 and 9 in each crystallizing tank are arranged in parallel, meaning that there is no fluid flow between the banks of cooling coils 7, 8 and 9. However, the cooling fluid enters each bank of cooling coils 7, 8 and 9 through a common inlet and leaves the banks of cooling coils 7, 8 and 9 through a common outlet. This minimizes the number of connections for the cooling fluid entering the banks of cooling coils 7, 8 and 9.

Figure 3:
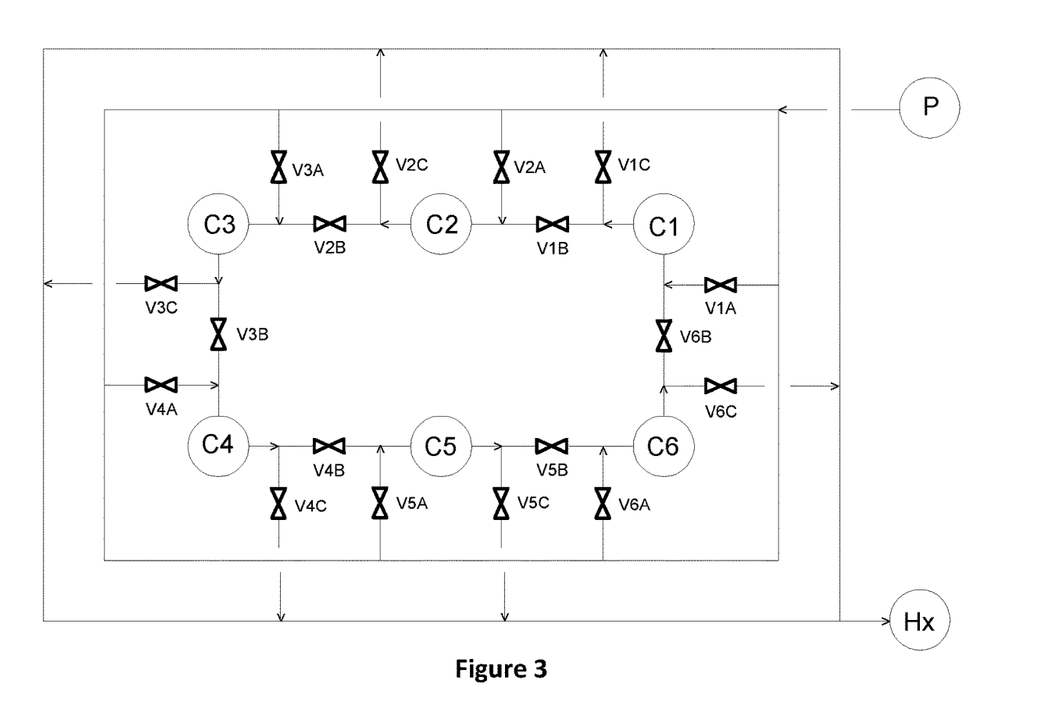
FIG. 3: shows the possible fluid communications in an arrangement according to the disclosure.
Figure 4:
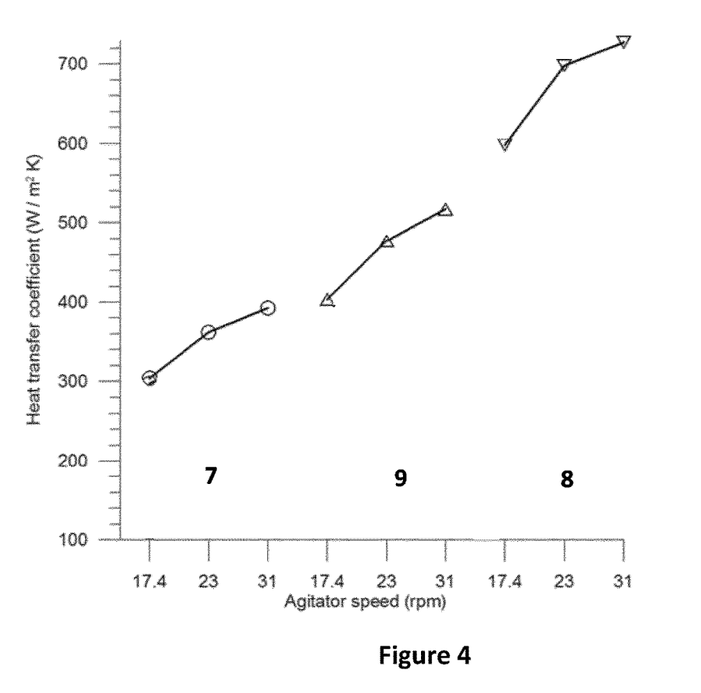
FIGS. 4, 5, 6 and 7: show the heat transfer coefficients for crystallizing tank temperatures of 35° C., 25° C., 15° C. and 5° C. respectively for each the outer (7), inner (8) and middle (9) banks of cooling coils as a function of the agitator speed.
Figure 5:
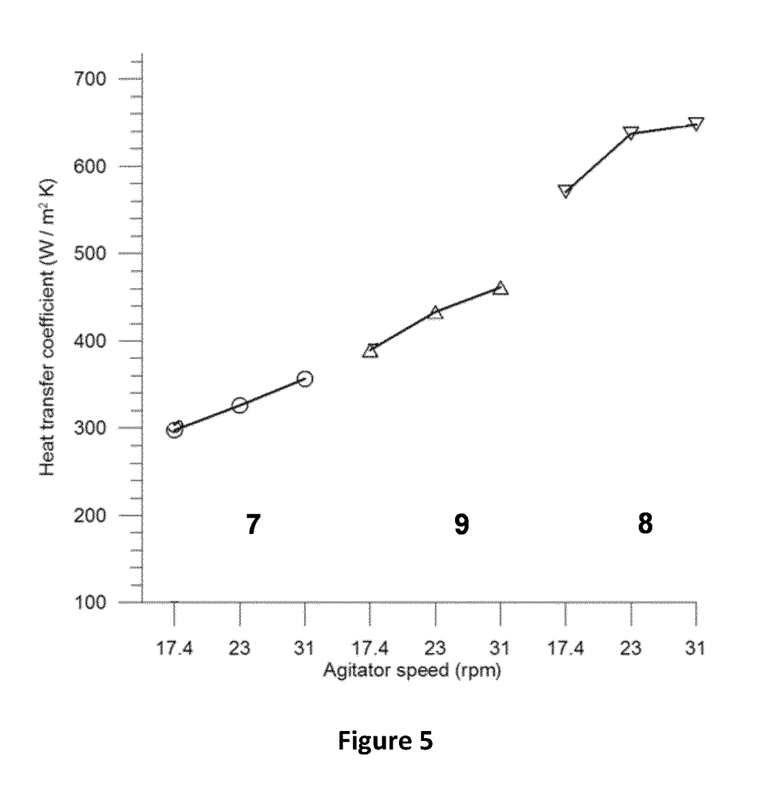
Figure 6:
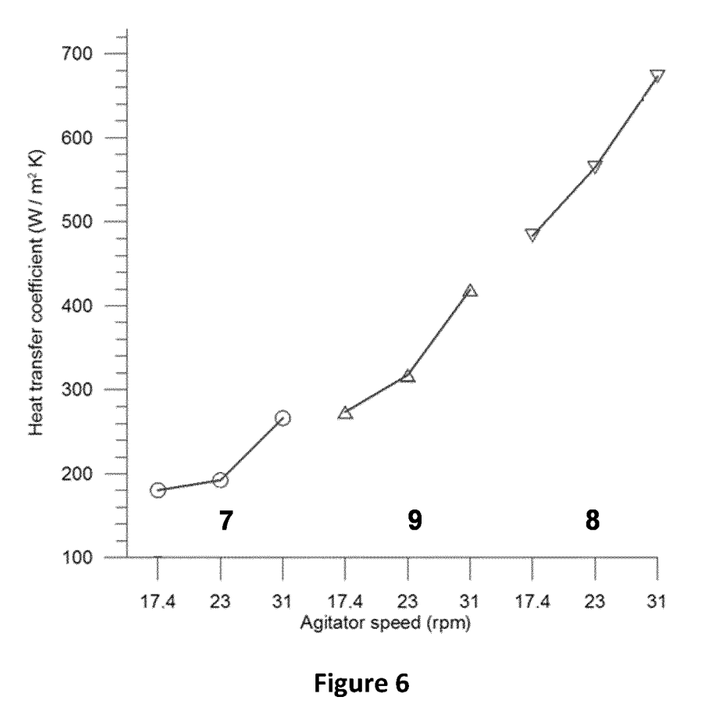
Figure 7:
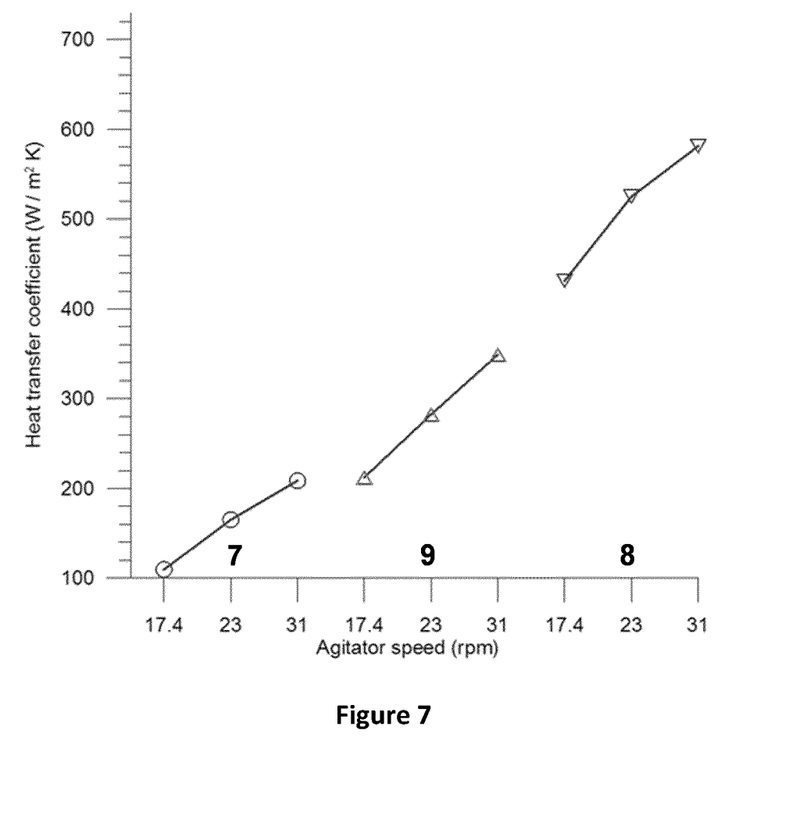

FIG. 3 depicts the possible cooling fluid communications between each crystallizing tank. According to one embodiment of the arrangement of crystallizing tanks, the banks of cooling coils 7, 8 and 9 are arranged in parallel and the cooling fluid enters each bank of cooling coils 7, 8 and 9 through a common inlet and leaves the banks of cooling coils through a common outlet. In addition, in each crystallizing tank, the inlet for the cooling fluid of each crystallizing tank is in direct fluid communication with either an external reservoir for the cooling fluid (valve A of the crystallizing tank is open and valve B is closed) or the outlet for the cooling fluid of the previous crystallizing tank in the series (valve B of the previous crystallizing tank is open and valve A is closed). Furthermore, the outlet for the cooling fluid in each crystallizing tank is in direct fluid communication with either the inlet for the cooling fluid of the subsequent tank in the series (valve B of the subsequent crystallizing tank is open and valve C is closed) or an external reservoir of used cooling fluid (valve C of the crystallizing tank is open and valve B of the subsequent crystallizing tank is closed), such that the cooling fluid leaves the arrangement. The circulation of the cooling fluid in the banks of cooling coils can be affected by, e.g., a pump or set of pumps and a set of valves, each of which can be electronically actuated.

As defined herein, the crystallizing tank subsequent to the last crystallizing tank in the series is the first crystallizing tank in the series. The fluid communications are such that the cooling fluid is circulated within the banks of cooling coils 7, 8 and 9 in all the crystallizing tanks.

When performing the method according to the disclosure using the above described arrangement, the filling, cooling, agitating, draining, and cleaning steps and the optional draining of the aqueous washing composition, are performed batch-wise and in parallel in each crystallizing tank according to the arrangement.

In addition, only one of the crystallizing tanks of the arrangement has its inlet for the cooling fluid in direct fluid communication with an external reservoir of cooling fluid, meaning that only one Valve A (FIG. 3) is open; this crystallizing tank is considered to be the first in the series, represented by C1 in FIG. 3. The cooling fluid is able to circulate in the banks of cooling coils 7, 8 and 9 of the remaining crystallizing tanks of the arrangement with the outlet for the cooling fluid in each crystallizing tank, with the exception of the last crystallizing tank in the series, being in fluid communication with the inlet for the cooling fluid of the subsequent crystallizing tank in the series. In other words, Valves B of all the crystallizing tanks but the last one in the series are open. The cooling fluid is able to exit the arrangement through the outlet for the cooling fluid of the last crystallizing tank in the series (C6 in FIG. 3). In other words, Valves B and C of the last crystallizing tank in the series are respectively closed and open.

This latter embodiment implies that the arrangement will comprise a coldest crystallizing tank and a warmest crystallizing tank. The coldest crystallizing tank is the first crystallizing tank in the series since it receives, in its bank of cooling coils 7, 8 and 9, the cooling fluid at its coldest temperature (being approximately the temperature of the reservoir of cooling liquid), being in direct fluid communication with an external reservoir of cooling fluid. The warmest tank is the last crystallizing tank in the series, since the cooling circulating in the banks of cooling coils 7, 8 and 9 of this last crystallizing tank has exchanged heat with the aqueous composition in all the previous crystallizing tanks and is, therefore, at its highest temperature. Preferably, the crystallizing tanks are positioned in a loop such that the coldest and warmest crystallizing tank are adjacent and the connections between the cooling banks of the crystallizing tanks are shortest.

The crystallization is expected to be completed earlier in the coldest crystallizing tank; this means that the temperature at which the draining step is initiated will be reached first in the coldest crystallizing tank. The draining step will then first be performed on the coldest crystallizing tank. As the temperature at which draining is to be performed has been reached in the coldest crystallizing tank, the following method steps are consecutively performed with respect to this crystallizing tank:

the direct fluid communication between the external reservoir of cooling fluid and the inlet for the cooling fluid of the coldest crystallizing tank is closed; in other words: Valve A of the coldest crystallizing tank is closed.

the fluid communication between the outlet for the cooling fluid of the coldest crystallizing tank and the inlet for the cooling fluid of the subsequent crystallizing tank is closed; in other words, Valve B of the coldest crystallizing tank is closed.

the direct fluid communication between the external reservoir of cooling fluid and the inlet for the cooling fluid of the subsequent crystallizing tank is opened; in other words, Valve A of the crystallizing tank subsequent to the coldest crystallizing tank is opened.

the content of the crystallizing tank is drained through the first outlet 5 for the slurry of crystallized material.

the scaling inside the crystallizing tank is removed with the aqueous washing composition, after introduction of the washing composition in the second inlet 4, and the aqueous washing composition is subsequently optionally drained through the second outlet 6.

the crystallizing tank from the previous point is filled according to the filling step.

as filling according to the previous point is taking place, the following fluid communications are adjusted as follows:

the direct fluid communication between the outlet for the cooling fluid in the crystallizing tank previous to the crystallizing tank being filled, and the outlet for collecting the cooling fluid, such that the cooling fluid leaves the arrangement, is closed; in other words, Valve C of the crystallizing tank previous to the crystallizing tank being filled, is closed.

the fluid communication between the inlet for the cooling fluid of the crystallizing tank being filled, and the outlet for the cooling fluid of the crystallizing tank previous to it, is opened; in other words, Valve B of the crystallizing tank previous to the crystallizing tank that is being filled, is opened.

direct fluid communication between the outlet for the cooling fluid of the crystallizing tank being filled, and the outlet for collecting the cooling fluid, such that it leaves the arrangement, is opened; in other words, Valve C of the crystallizing tank that is being filled, is opened.

The crystallizing tank that has been drained and filled with the aqueous composition comprising the dissolved one or more compounds, previously the coldest crystallizing tank, now becomes the last in the series and the hottest, while the crystallizing tank subsequent to it, becomes the first and coldest crystallizing tank. By applying the methodology of this embodiment, it therefore results that each crystallizing tank will be, in turn, the coldest and its content will, therefore, be drained. Also, the inlet for the cooling fluid of each crystallizing tank is, in turn, in direct fluid communication with the external reservoir of cooling fluid and the cooling fluid exits the arrangement from, in turn, the outlet for the cooling fluid of each crystallizing tank. This results in the advantage of the system that removal of scaling inside in each crystallizer can, in turn, be performed, while crystallization is being completed in the other crystallizing tanks of the arrangement.

Once the cooling fluid has exited the arrangement, it can have a temperature as high as 50° C. and can, for example through a heat exchange system, be cooled to the necessary temperature range ranging from −40° C. to −5° C., before being fed again to the external reservoir of cooling fluid and, subsequently, in the arrangement (FIG. 3).

It is apparent that, using the arrangement of the disclosure, other embodiments may be envisaged, all within the ambit of the skilled person that has understood the present disclosure.

EXAMPLE

A series of six crystallizers Cs, each according to FIG. 1 and with a volume of 43 m$^3$, was used for producing calcium nitrate tetrahydrate by crystallizing calcium nitrate from an aqueous composition comprising from 6 to 12 weight % nitric acid, from 11 to 17 weight % phosphoric acid, and from 36 to 49 weight % dissolved calcium nitrate, directly obtainable from digesting phosphate rock in nitric acid. Each crystallizer comprised the following elements:

a vertical cylindrical section defined by a top end 1 and a bottom end 2, each end having a circular cross section;

an inlet 3 for introducing the aqueous calcium nitrate composition into the cylindrical section;

three concentric banks of cooling coils 7, 8 and 9 running alongside each other and parallel to the axis running through the centers of the circular cross section of the top end and the bottom end of the cylindrical section;

an agitator 10 equipped with 4 paddles 11, each of a total length of approximately 1.6 m, extending perpendicularly to its rotation axis running through the centers of the two circular bases of the cylindrical section, driven by an agitator motor 12 and a temperature measurement device 13 (not shown) for measuring a temperature in the crystallizing tank;

The aqueous calcium nitrate composition was introduced into each crystallizer by pumping the aqueous calcium nitrate composition from a common reservoir for the aqueous calcium nitrate composition. The pump pumping the aqueous calcium nitrate composition from the corresponding reservoir had separate fluid communications with the inlet 3 of each crystallization tank.

While introducing the aqueous calcium nitrate composition into each crystallizing tank, a 20% weight solution of ammonia in water having an initial temperature of approximately −10° C., the cooling fluid, started to be circulated in the banks of cooling coils of each crystallizing tank. The fluid connections between the banks of cooling coils were according to what is shown in FIG. 3. The inlet for the cooling fluid of C1 was in direct fluid communication with an external reservoir of cooling fluid. For each of C1 to C5, the outlet for the cooling fluid was in fluid communication with the inlet for the cooling fluid of the subsequent crystallizer in the series. The cooling fluid exited the series of crystallizers through the outlet for the cooling fluid of C6.

After all six crystallizing tanks were filled with the aqueous composition, the agitator 10 was agitated at a speed of 31 rpm, corresponding to a power input to the agitator of approximately 800 W/m$^2$.

The heat transfers coefficients were measured for each bank of cooling coil in C5 as a function of the temperature and the agitation speed. The results are shown in FIGS. 4, 5, 6 and 7 for crystallizing tank temperatures of 35° C., 25° C., 15° C. and 5° C. respectively for each the outer 7, inner 8 and middle 9 banks of cooling coils.

FIGS. 4 to 7 show that the heat transfer coefficient decreases at decreasing temperature and agitation speed and at increasing distance from the agitator, or stated differently, increasing the agitation speed increases the heat transfer coefficient for each of the outer 7, inner 8 and middle 9 banks of cooling coils. From FIG. 4, it is possible, at an agitation speed of 31 rpm, to achieve a heat transfer coefficient of 400 W/m$^2$·K, on the bank of cooling coils 7 most distant from the agitator, resulting in increased crystallization efficiency. In view of the link between agitation speed and heat transfer coefficient, the person skilled in the art understands and will easily recognize that a heat transfer coefficient of 400 W/m$^2$K and higher on the cooling coil the most distant from the agitator may be obtained for the configuration of FIG. 5, 6 or 7 simply by increasing the agitation speed.

The invention claimed is:

1. A method for crystallizing calcium nitrate from an aqueous calcium nitrate composition comprising from 6 to 12 weight % nitric acid, from 11 to 17 weight % phosphoric acid, and from 36 to 49 weight % dissolved calcium nitrate, comprising steps of:

a) filling at least one vertical crystallizing tank through an inlet with the aqueous calcium nitrate composition, the crystallizing tank comprising:
   a vertical cylindrical section defined by a top end and a bottom end, each end having a circular cross section;
   a first inlet for introducing the aqueous calcium nitrate composition into the cylindrical section;
   a first outlet for draining a slurry of crystallized calcium nitrate at the bottom end;
   a second inlet for introducing an aqueous washing composition;
   concentric banks of cooling coils running alongside each other and parallel to an axis running through centers of the circular cross section of the top end and the bottom end of the cylindrical section;
   an agitator equipped with paddles fixed to its rotation axis which runs through centers of two circular bases of the cylindrical section, driven by an agitator motor and
   a temperature measurement device for measuring a temperature in the crystallizing tank;

b) circulating a cooling fluid through the banks of cooling coils, with an initial temperature ranging from −40° C. to −5° C. and c) rotating the agitator such that a minimum heat transfer is achieved;

characterized in that the crystallizing tank comprises three banks of cooling coils and the agitator is rotated at such speed that a minimum average heat transfer of 400 W/m$^2$·K is achieved on the bank of cooling coils most distant from the agitator.

2. The Method according to claim 1, wherein the steps a), c) and b) are performed consecutively in that order.

3. The method according to claim 1, wherein the cooling fluid is selected from a group of water, ammonia and mixtures thereof.

4. The method according to claim 1, wherein the cooling fluid is a 20 weight % solution of ammonia in water.

5. The method according to claim 1, further comprising consecutive steps, performed after step c), of:

d) measuring the temperature with the temperature measurement device in the crystallizing tank;

e) draining a content of the crystallizing tank through the first outlet when the temperature reaches a value from 0 to 4° C.; and f) introducing the aqueous washing composition through the second inlet and removing scaling from an inside of the crystallizing tank.

6. The method according to claim 1, further comprising consecutive steps, performed after step c), of:

q) measuring the temperature with the temperature measurement device in a first crystallizing tank as defined in claim 1;

r) upon detecting an increase in the temperature in the first crystallizing tank, draining the first crystallizing tank through its first outlet for draining the slurry of crystallized material into a second crystallizing tank as defined in claim 1;

s) circulating a cooling fluid through the banks of cooling coils of the second crystallizing tank, having an initial temperature ranging from −40° C. to −5° C.;

t) rotating the agitator of the second crystallizing tank such that a minimum heat transfer of 400 W/m$^2$·K is achieved on the cooling coil the most distant from the agitator; and u) introducing the aqueous washing composition through the second inlet of the first crystallizing tank and removing scaling from an inside of the first crystallizing tank;

wherein the cooling fluid in the first crystallizing tank is water, and wherein the cooling fluid in the second crystallizing tank is a 20 weight % solution of ammonia in water.

7. The method according to claim 6, further comprising the consecutive steps of:
w) measuring the temperature in the second crystallizing tank;
x) draining a content of the second crystallizing tank through its first outlet when the temperature reaches a value ranging from 0 to 4° C.; and
y) introducing the aqueous washing composition through the first inlet of the second crystallizing tank and removing the scaling from the inside of the second crystallizing tank.

8. The method according to claim 1, wherein the aqueous calcium nitrate composition comprising from 6 to 12 weight % nitric acid, from 11 to 17 weight % phosphoric acid, and from 36 to 49 weight % dissolved calcium nitrate is directly obtainable from digesting phosphate rock in nitric acid.

9. A vertical crystallizing tank for crystallizing one or more dissolved compounds from an aqueous composition thereof, comprising:
a vertical cylindrical section defined by a top end and a bottom end, each end having a circular cross section;
a first inlet for introducing the aqueous composition comprising one or more dissolved compounds;
a second inlet for introducing an aqueous washing composition;
a first outlet for draining a slurry of crystallized one or more dissolved compounds at the bottom end;
concentric banks of a number of cooling coils running alongside each other and parallel to an axis running through centers of the circular cross section of the top end and the bottom end of the cylindrical section;
a cooling fluid circulating through the banks of cooling coils;
a temperature measurement device for measuring a temperature in the crystallizing tank and
an agitator equipped with paddles fixed to its rotation axis which runs through centers of two circular bases of the cylindrical section, driven by an agitator motor;
characterized in that the number of banks of cooling coils is three.

10. The crystallizing tank according to claim 9, wherein the bottom end has a conical shape.

11. The crystallizing tank according to claim 9, wherein the cylindrical section has a height to diameter ratio ranging from 1.5 to 2.5.

12. An arrangement of two or more vertical crystallizing tanks according to claim 9, comprising at least a first crystallizing tank and a last crystallizing tank, wherein the banks of cooling coils of said two or more vertical crystallizing tanks are interconnected.

13. The arrangement according to claim 12, wherein the banks of cooling coils in each crystallizing tank are not in fluid communication and have a common inlet and a common outlet for the cooling fluid.

14. The arrangement according to claim 13, wherein the inlet for the cooling fluid of each crystallizing tank is in direct fluid communication with either an external reservoir of cooling fluid or the outlet for the cooling fluid of a previous one of the crystallizing tanks, and wherein the outlet for the cooling fluid in each crystallizing tank is in direct fluid communication with either the inlet for the cooling fluid of a subsequent one of the crystallizing tanks or a reservoir for collecting the cooling fluid out of the arrangement, and wherein the crystallizing tank subsequent to the last crystallizing tank is the first crystallizing tank.

15. The method according to claim 5, wherein the crystallizing tank further comprises a second outlet for draining the aqueous washing composition at the bottom end, wherein the method further comprising step g) of collecting the aqueous washing composition through the second outlet, wherein the crystallizing tank is an arrangement of two or more crystallizing tanks, and wherein the steps a) to g) are performed batch-wise and in parallel in each crystallizing tank of the arrangement.

16. The method according to claim 15, wherein the inlet for the cooling fluid of one crystallizing tank only is in direct fluid communication with an external reservoir of cooling fluid, and wherein only the outlet for the cooling fluid of the crystallizing tank previous to this one crystallizing tank is in fluid communication with an external reservoir of used cooling fluid leaving the arrangement, and wherein, prior to performing step e) in this one crystallizing tank, the following further steps are consecutively performed with respect to this one crystallizing tank:
h) closing the direct fluid communication between the external reservoir of cooling fluid and the inlet for the cooling fluid of the crystallizing tank;
i) closing the fluid communication between the outlet for the cooling fluid of the crystallizing tank and the inlet for the cooling fluid of a subsequent one of the crystallizing tanks;
j) opening the direct fluid communication between the external reservoir of cooling fluid and the inlet for the cooling fluid of the subsequent crystallizing tank;
k) performing step e);
l) performing steps f) and g);
m) filling the crystallizing tank with the aqueous calcium nitrate composition, according to step a);
n) during step m), closing the direct fluid communication between the outlet for the cooling fluid of a crystallizing tank precedent to the crystallizing tank being filled, and the reservoir of used cooling fluid;
o) during step m), opening the direct fluid communication between the outlet for the cooling fluid of the crystallizing tank precedent to the crystallizing tank being filled, and the inlet for the cooling fluid of the crystallizing tank and
p) during step m), opening the direct fluid communication between the outlet for the cooling fluid of the crystallizing tank being filled and the reservoir of used cooling;

such that the inlet for the cooling fluid of each crystallizing tank is, in turn, in direct fluid communication with an external reservoir of cooling fluid, and that the outlet for the cooling fluid of each crystallizing tank is, in turn, in direct fluid communication with an external reservoir of used cooling fluid.

17. The method according to claim 1, wherein the crystallizing tank further comprises a second outlet for draining the aqueous washing composition at the bottom end.

18. The method according to claim 17, further comprising consecutive steps, performed after step c), of:
d) measuring the temperature with the temperature measurement device in the crystallizing tank;

e) draining a content of the crystallizing tank through the first outlet when the temperature reaches a value from 0 to 4° C.;

f) introducing the aqueous washing composition through the second inlet and removing scaling from an inside of the crystallizing tank and g) collecting the aqueous washing composition through the second outlet.

19. The method according to claim 17, further comprising consecutive steps, performed after step c), of:

q) measuring the temperature with the temperature measurement device in a first crystallizing tank as defined in claim 1;

r) upon detecting an increase in the temperature in the first crystallizing tank, draining the first crystallizing tank through its first outlet for draining the slurry of crystallized material into a second crystallizing tank as defined in claim 1;

s) circulating a cooling fluid through the banks of cooling coils of the second crystallizing tank, having an initial temperature ranging from −40° C. to −5° C.;

t) rotating the agitator of the second crystallizing tank such that a minimum heat transfer of 400 W/m$^2$·K is achieved on the cooling coil the most distant from the agitator;

u) introducing the aqueous washing composition through the second inlet of the first crystallizing tank and removing scaling from an inside of the first crystallizing tank, and v) draining the aqueous washing composition through the second outlet of the first crystallizing tank;

wherein the cooling fluid in the first crystallizing tank is water, and wherein the cooling fluid in the second crystallizing tank is a 20 weight % solution of ammonia in water.

20. The method according to claim 19, further comprising the consecutive steps of:

w) measuring the temperature in the second crystallizing tank;

x) draining a content of the second crystallizing tank through its first outlet when the temperature reaches a value ranging from 0 to 4° C.;

y) introducing the aqueous washing composition through the first inlet of the second crystallizing tank and removing the scaling from the inside of the second crystallizing tank, and z) draining the aqueous washing composition at the second outlet of the second crystallizing tank.

21. The crystallizing tank according to claim 9, further comprising a second outlet for draining the aqueous washing composition at the bottom end.

* * * * *